United States Patent
Wicks

(10) Patent No.: US 10,001,094 B2
(45) Date of Patent: Jun. 19, 2018

(54) ENGINE VARIABLE CHARGE MOTION SYSTEM

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/182,401

(22) Filed: Jun. 14, 2016

(65) Prior Publication Data

US 2017/0356402 A1 Dec. 14, 2017

(51) Int. Cl.
*F02M 35/10* (2006.01)
*F02D 41/00* (2006.01)
*F02F 1/42* (2006.01)

(52) U.S. Cl.
CPC ... *F02M 35/10072* (2013.01); *F02D 41/0002* (2013.01); *F02D 41/0007* (2013.01); *F02F 1/425* (2013.01); *F02D 2041/0015* (2013.01); *F02D 2200/0406* (2013.01); *F02D 2200/101* (2013.01); *F02D 2200/501* (2013.01)

(58) Field of Classification Search
CPC .......... F02D 9/08; F02D 9/18; F02D 41/0002; F02M 35/10019; F02M 35/10045; F02M 35/10052; F02M 35/10072; F02M 35/10111; F02M 35/10229; F02M 35/10301; F02F 1/425; F02B 27/0294
USPC ............ 123/184.21, 184.22, 184.35, 184.42, 123/184.56, 184.61, 434
See application file for complete search history.

(56) References Cited

U.S. PATENT DOCUMENTS

| | | | | |
|---|---|---|---|---|
| 4,928,638 | A | 5/1990 | Overbeck | |
| 5,165,374 | A * | 11/1992 | Chapman | F02B 31/06 123/308 |
| 6,827,060 | B2 * | 12/2004 | Huh | F02B 31/06 123/306 |
| 7,281,512 | B2 * | 10/2007 | Marentette | F02B 27/02 123/184.21 |
| 7,938,099 | B2 * | 5/2011 | Abe | F02B 31/06 123/306 |
| 2015/0101551 | A1 * | 4/2015 | Kawasaki | B23K 33/008 123/41.72 |
| 2015/0247472 | A1 * | 9/2015 | Nomura | F01P 3/02 123/41.74 |
| 2016/0195046 | A1 * | 7/2016 | Rollins | F02M 25/0836 123/434 |
| 2016/0215704 | A1 * | 7/2016 | Wicks | F02D 9/18 |

OTHER PUBLICATIONS

Wicks, Christopher Donald, "Method and System for Engine Variable Charge Motion System," U.S. Appl. No. 14/607,908, filed Jan. 28, 2015, 60 pages.

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for introducing a charge motion to a cylinder via a protrusion system coupled to an intake port of an engine. In one example, a system may include positioning a tongue from inside a spring-loaded casing to extend into air intake runner, generating desired tumble and swirl along an intake port proximate to an engine cylinder.

14 Claims, 7 Drawing Sheets

ENGINE VARIABLE CHARGE MOTION SYSTEM

FIELD

The present description relates generally to methods and systems for controlling a vehicle engine to adjust a protrusion system in an intake air path.

BACKGROUND/SUMMARY

Increased motion of air and/or fuel charge injected into an engine combustion chamber can increase combustion efficiency under some conditions. For example, charge motion can increase the effectiveness of combustion by introducing air velocity and turbulence in directions perpendicular to the flow direction. By introducing additional kinetic energy into the combustion chambers, an ignition front may traverse the volume of the combustion chamber more quickly and more evenly, so as to interact with a heightened amount of fuel before thermal energy is translated to piston motion. Further, resulting turbulence may increase homogenization of the air-to-fuel mixture within the combustion chamber as well as increase the burn rate, which is the time required for the air/fuel mixture to burn completely during the combustion process.

To improve charge tumble and swirl parameters, various motion control devices may be coupled upstream of the intake of engine cylinders. By varying the charge motion of a cylinder, the cylinder burn rate can be varied. One example motion control device is shown by Overbeck in U.S. Pat. No. 4,928,638. Therein, an individual variable bladder is placed within an engine intake runner. The tongue may be configured to have a variable cross-section, where the cross-section is varied based on engine operating parameters. Specifically, a degree of inflation of the bladder is adjusted to vary the degree of occlusion of the flow path available for an air-fuel mixture entering the intake manifold.

However, the inventor herein has recognized potential issues with such devices. As one example, in addition to being spatially constrained, the bladder may be prone to thermal degradation due to proximity of the bladder to the hot cylinder head. Further, proximity to the hot cylinder head may affect the ability to control the amount of inflation/deflation achieved. For example, bladder heating may result in more inflation than desired. As such, this may adversely affect a combustion air-fuel ratio control. As another example, the bladder of Overbeck affects the charge motion to all cylinders globally but may not be able to adjust the charge motion of each cylinder individually. As such, there may be conditions where certain cylinders demand more or less charge motion than other cylinders.

In one example, the issues described above may be addressed by a system including a cylinder with an intake runner, and a protrusion system positioned in an opening on a bottom wall of the intake runner nearest the cylinder, the protrusion system including a tongue movably positioned inside a spring-loaded casing, the spring-loaded casing anchored to a region of the bottom wall defining the opening. The system may include a controller storing non-transitory instructions in memory that when executed cause the controller to activate an actuator for positioning the tongue of the protrusion system outward from the spring-loaded casing through the opening on the bottom wall of the intake runner, responsive to an operating condition. The system may also include a second protrusion system, including a second tongue, the second tongue movably positioned inside a second spring-loaded casing, the second spring-loaded casing anchored to an upper wall of an intake manifold, the intake manifold fluidically connecting to the intake runner.

The above described approach may provide various advantages, including extending or retracting the tongue of the protrusion system may increase air/fuel mixing, and thereby, increase fuel economy. By using an actuator based efficient and compact protrusion system for extending the tongue of the protrusion system through an opening at the bottom wall of the intake runner, a desired tumble may be generated in the intake air charge. Additionally, the tongue may be adjusted based on sensed engine operations to optimize fuel efficiency of each individual engine cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
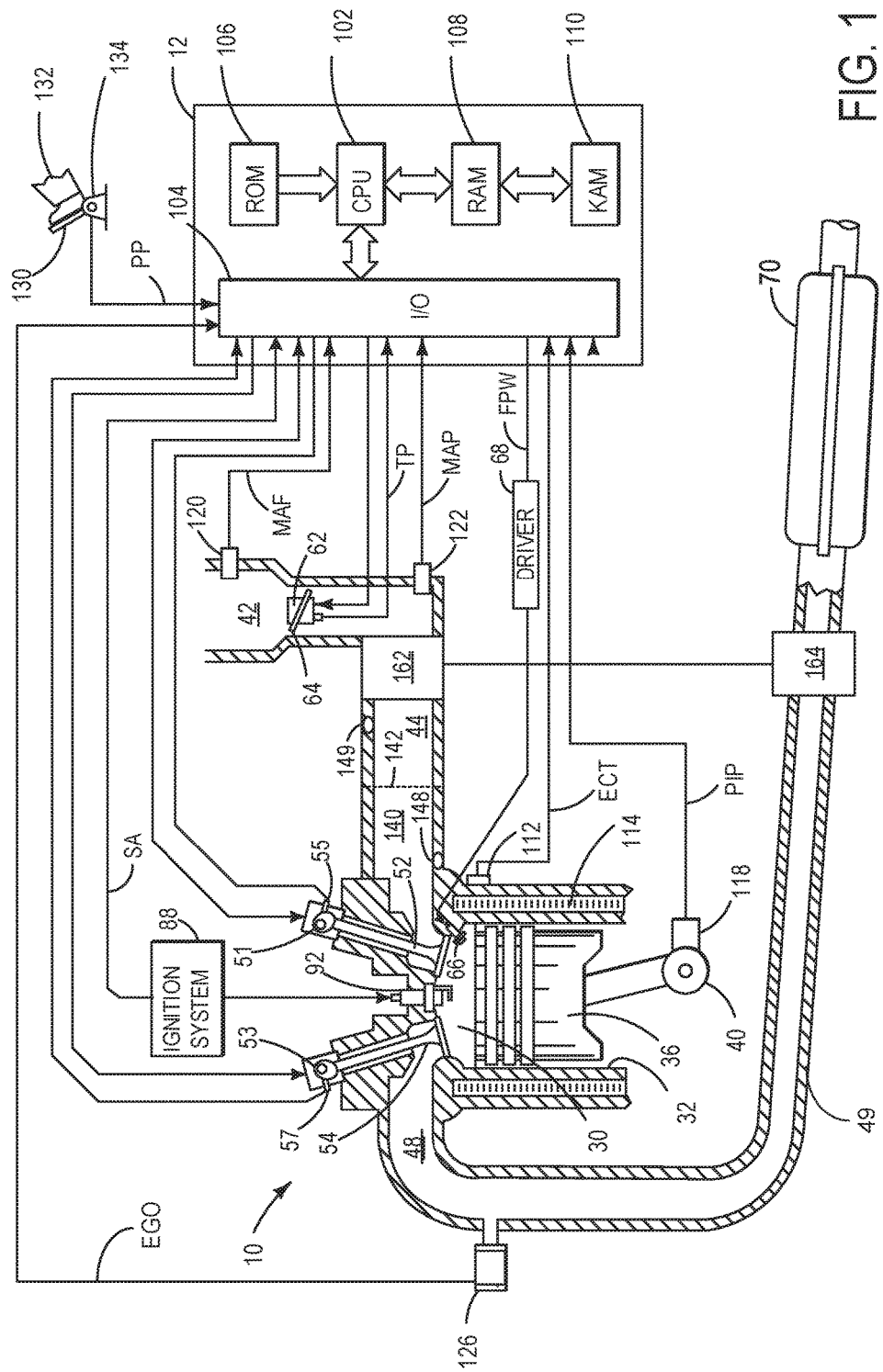
FIG. 1 illustrates an engine including a variable tongue.
Figure 2:
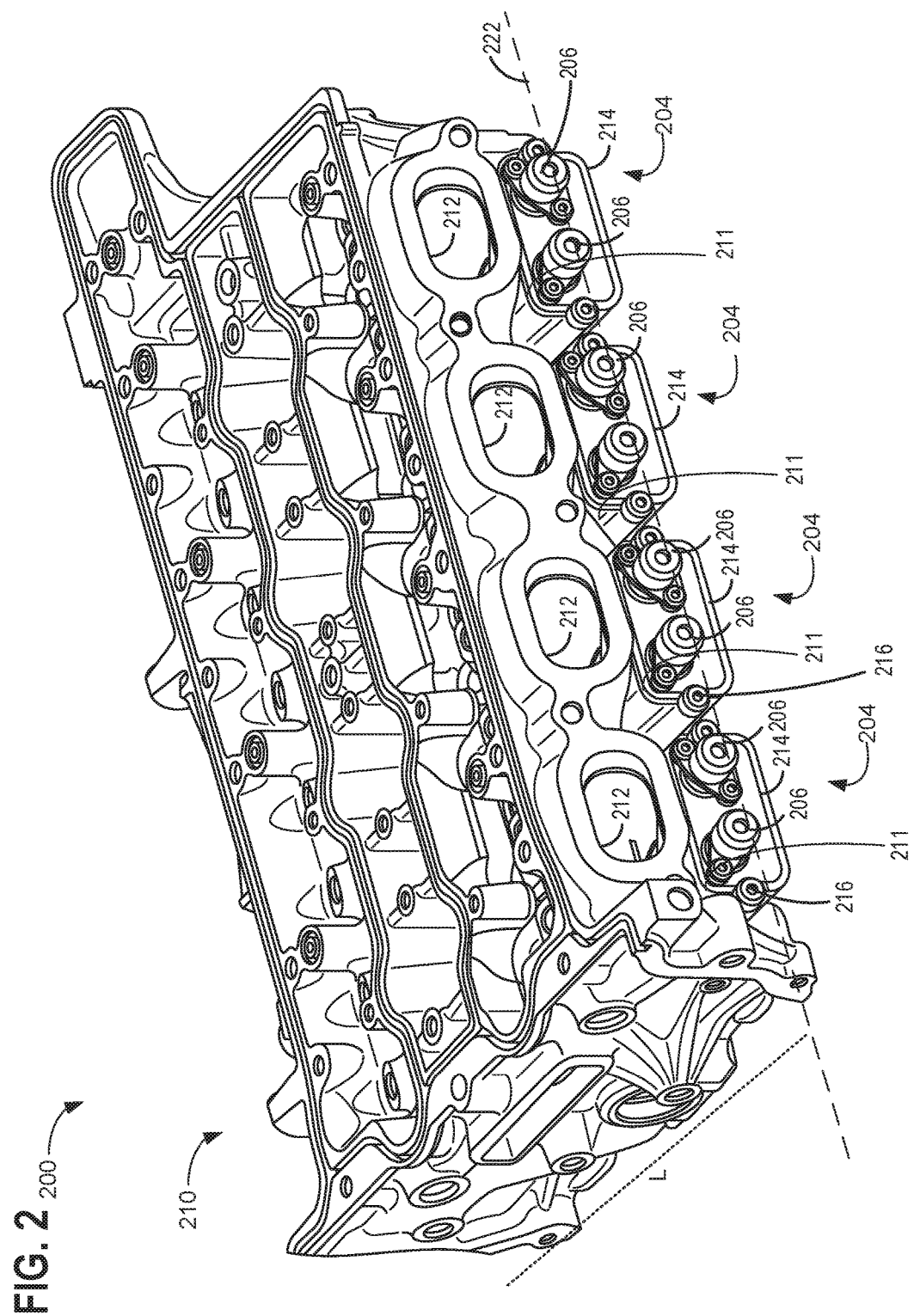
FIG. 2 depicts an engine cylinder head, a plurality of intake ports and an actuator coupled to each of the intake ports.

The following description relates to systems and methods for a protrusion system, including an actuated tongue retraction and extension mechanism, coupled to an intake system of an engine, such as the engine depicted in FIG. 1. The protrusion system may include a cartridge, and the cartridge may be inserted in an engine bulkhead, the engine bulkhead positioned vertically below a plurality of intake ports, as shown at FIG. 2. A tongue of the protrusion system may be in a retracted position, as depicted in FIGS. 3A and 4, or the tongue may be in an extended position (illustrated in FIG. 5), protruding into an intake runner coupled to the intake port, and generating desired tumble in air flowing along the intake runner to an engine cylinder. The position of the tongue may be adjusted via a controller in coordination with an actuator of the protrusion system, and based on information from a variety of applicable sensors. The controller may be programmed with instructions to perform a control routine, such as the routine of FIG. 6, to extend or retract the tongue responsive to an engine load (e.g., an intake throttle position more closed or less closed depending on the engine load). A method coordinating operation of a first protrusion system and a second protrusion system located at distinct portions of the intake system is discussed with reference to FIG. 7.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 is a schematic diagram showing an example embodiment of one cylinder of multi-cylinder engine 10, which may be included in a propulsion system of an automobile. Engine 10 is controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (cylinder) 30 of engine 10 includes cylinder bore walls 32 with piston 36 positioned therein. As depicted, piston 36 is coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

As shown in the example of FIG. 1, combustion chamber 30 receives intake air from intake manifold 44 via an air intake system (AIS) duct 42 and exhausts combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Upstream of intake valve 52, a charge motion device (e.g., a protrusion system) 148 may be positioned in an opening of the bottom most wall of an intake port 140. Dashed line 142 represents a border between the intake port 140 and the intake manifold 44. In some examples, the protrusion system 148 may extend from the intake port 140 towards (and into) the intake manifold 44. The protrusion system 148 may be placed 10-40 mm away from a portion of intake valve 52 in contact with the bottom most wall of the intake port 140. In this position, the protrusion system 148, when extended, may obstruct air flowing toward the intake valve 52 and thereby manipulate an airflow to create a tumble effect for charge entering the corresponding cylinder. The tumble may be defined as a swirling motion used to increase an air/fuel mixture homogeneity.

The protrusion system 148 located within the intake port 140 may be extended or retracted responsive to a sensed engine condition. As an example, the protrusion system 148 may at least be partially extended responsive to a throttle position becoming more closed (e.g., engine load decreasing). This may be due to a reduced air/fuel mixing efficacy caused by a decrease in an airflow rate. To circumvent this dilemma, the protrusion system 148 may be extended in order to create a tumble. Due to the proximity of the protrusion system 148 with respect to a cylinder intake valve 52, (e.g., the tongue may be located between 10-40 mm from a bottom portion of the intake valve in contact with an intake runner coupled to the intake port 140), the tumble may be created in order to increase an air/fuel mixing efficacy.

A projection of the protrusion system 148 may be flush with the bottom most wall of the intake port 140 when the protrusion system is in a retracted position. In one example, the protrusion system 148 in a completely retracted state does not obstruct any portion of the intake port 140. The protrusion system 148 may be coupled to a coolant seal (not shown in FIG. 1). As described above, combustion chamber 30 may include two or more intake valves. If combustion chamber 30 includes two or more intake valves, one protrusion system may be provided for each intake valve. In this way, a plurality of protrusion systems 148 in combination with a plurality of intake valves 52 may exist.

In some embodiments, additionally or alternatively, a second protrusion system 149 may be located within the air intake manifold inlet. In one example, the second protrusion system 149 may be larger than the protrusion system 148. The second protrusion system 149 may be located on a topmost wall of an intake manifold inlet farthest from the combustion chamber 30. That is to say, the engine 10 may include two different protrusion systems, the protrusion system 148 located on a bottom most wall of an intake port 140 nearest the combustion chamber 30 and a second protrusion system 149 located on the topmost wall of the intake manifold inlet farthest from the combustion chamber 30. The protrusion system 148 may be closer to the combustion chamber compared to the second protrusion system 149. The intake manifold may be discussed in further detail below. The second protrusion system 149 may be located downstream of a compressor 162 and upstream of dashed line 142.

In one embodiment, for an engine comprising four combustion chambers, where each combustion chamber comprises two intake valves, the engine may comprise one protrusion system 148 in each of the intake runners of the combustion chambers and may also comprise the second protrusion system 149 in the intake manifold. Thus, the engine described may comprise a total of eight protrusion systems 148 and an additional protrusion system 149.

The second protrusion system 149 may affect airflow to all the cylinders globally, not individually, upon extension, whereas the protrusion system 148 may only affect airflow to an individual cylinder upon extension. Therefore, the second protrusion system 149 may at least partially obstruct an airflow to the combustion chamber 30 upon extension. The second protrusion system 149 may be flush with the upper wall of the air intake manifold upon complete retraction such that it does not obstruct a bore of the air intake manifold.

When extended, the second protrusion system may manipulate airflow through the air intake manifold such that a rate of airflow (e.g., a velocity) is increased. In this way, air may be delivered at an increased rate to the combustion chamber 30. A retracted second tongue of the second protrusion system may permit an increased amount of air to flow through the air intake manifold. The tongue of the second protrusion system may be configured to be held in a plurality of partially extended positions. A rate of airflow flowing by a less extended second tongue may be less than the rate of airflow flowing by a more extended second tongue.

Intake valve 52 and exhaust valve 54 are controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The positions of intake valve 52 and exhaust valve 54 are determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection of fuel into combustion cylinder 30.

As shown in FIG. 1, located between the AIS duct 42 and the intake manifold 44 may be a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 is provided to controller 12 by throttle position signal TP, for example. The AIS duct 42 further includes a mass airflow sensor 120 and a manifold absolute pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake manifold 44 or AIS duct 42. For a turbocharger, compressor 162 may be at least partially driven by a turbine 164 (e.g., via a shaft) placed within the exhaust air path, the turbine typically placed as close to the combustion chamber as the package will allow in an effort to apply as much energy as possible directly on the turbine wheel. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12.

Exhaust gas sensor 126 is shown coupled to exhaust pipe 49 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling jacket 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor may give an indication of engine torque, for example. Further, this sensor, along with the detected engine speed, can provide an estimate of charge (including air) inducted into the cylinder. In one example, sensor 118, which is also used as an engine speed sensor, may generate a predetermined number of equally spaced pulses each revolution of the crankshaft.

FIG. 2 shows a perspective view 200 of a cylinder head 210 along with a plurality of intake ports 212, each intake port associated with a corresponding protrusion system of a plurality of protrusion systems 204. Each protrusion system of the plurality of protrusion systems 204 includes a cartridge 214 and an actuator 206. The actuator 206 may be an electric actuator that may regulate a position of a shaft of the protrusion system as will be described below with reference to FIGS. 3-5. Each of the cartridges 214 is inserted into a bulkhead 211, the bulkhead 211 including an opening vertically below each corresponding intake port, the opening leading to a tubular passage underneath a bottom surface of an intake runner coupled to a corresponding intake port.

As used herein, the term intake port may include an opening in the cylinder head where intake air is received from an intake manifold (for example, the intake manifold 44 of FIG. 1), one or more intake runners, and one or more cylinder ports. In one example, a single intake port may include only one corresponding intake runner and cylinder port. In another example, a single intake port may include two intake runners, each intake runner coupled to a respective cylinder port. The cylinder ports may include the openings in the cylinder that receive intake air and intake air flow to the cylinder via the cylinder port may be regulated by an intake valve (for example, the intake valve 52 illustrated in FIG. 1).

Each of the cartridges 214 may be secured to the bulkhead 211, for example, by bolts 216. Below each of the intake ports of the plurality of intake ports 212, each of the protrusion systems 204 may extend partly along a length L of the cylinder head 210 (a cross section of the protrusion system illustrated in FIG. 3A), and may be perpendicular to a lateral axis 222 of the cylinder head 210.

Each protrusion system of the plurality of protrusion systems 204 may occupy a space underneath an air intake manifold (for example, the intake manifold 44 of FIG. 1), thereby allowing the protrusion system to be accommodated despite limited space availability in the vicinity of the cylinder head. In one example, coolant may circulate in the vicinity of the protrusion system along the tubular passage of the bulkhead 211, protecting the protrusion system from thermal degradation. The opening of the bulkhead 211 may include a seal (not shown in FIG. 2) interfacing with the cartridge 214 of the protrusion system, preventing leaking of fluids, such as coolant, from the bulkhead 211 opening.

Figure 3:
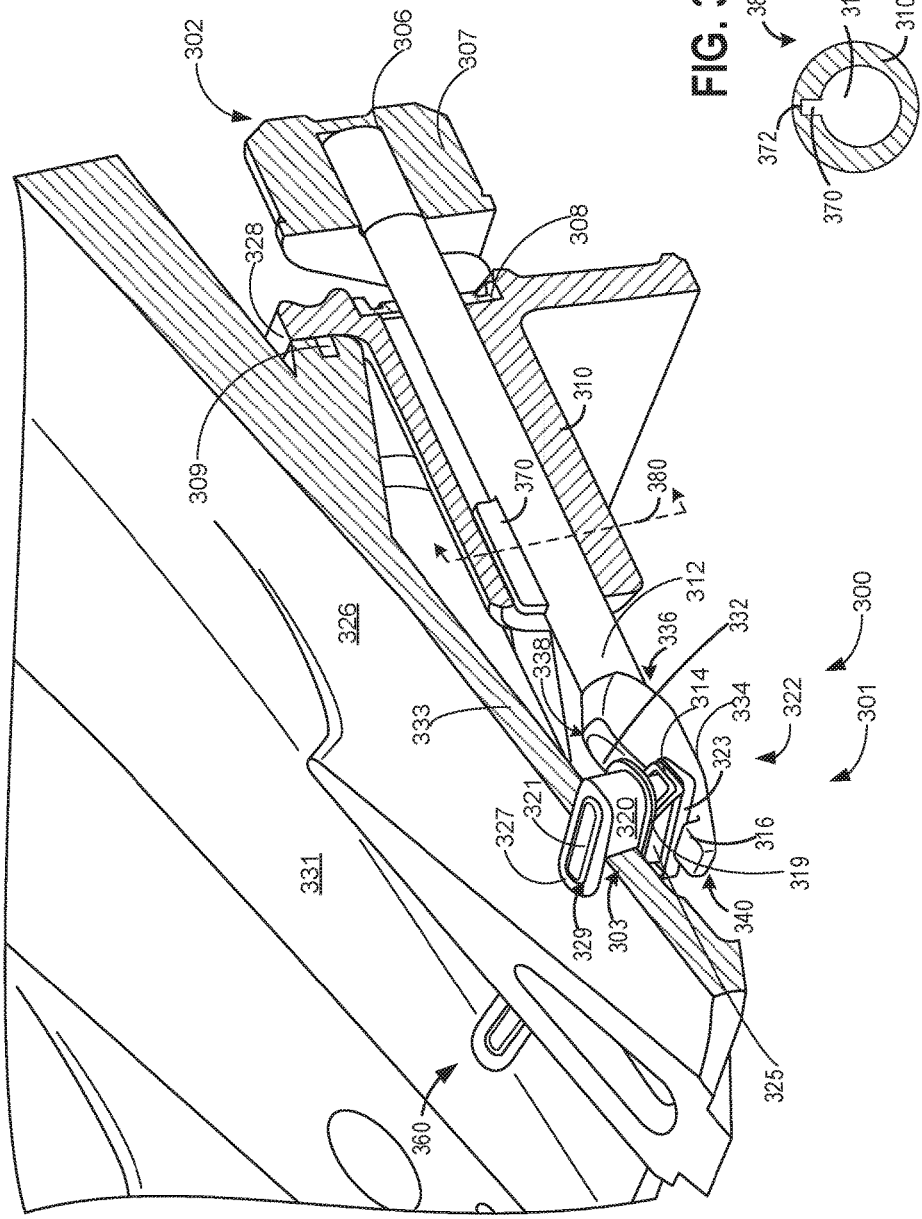
FIG. 3A illustrates a detailed depiction of a retracted tongue coupled to the actuator of FIG. 2.
FIG. 3B shows a vertical cross-section of a shaft coupled to a cartridge of the protrusion system.
Figure 4:
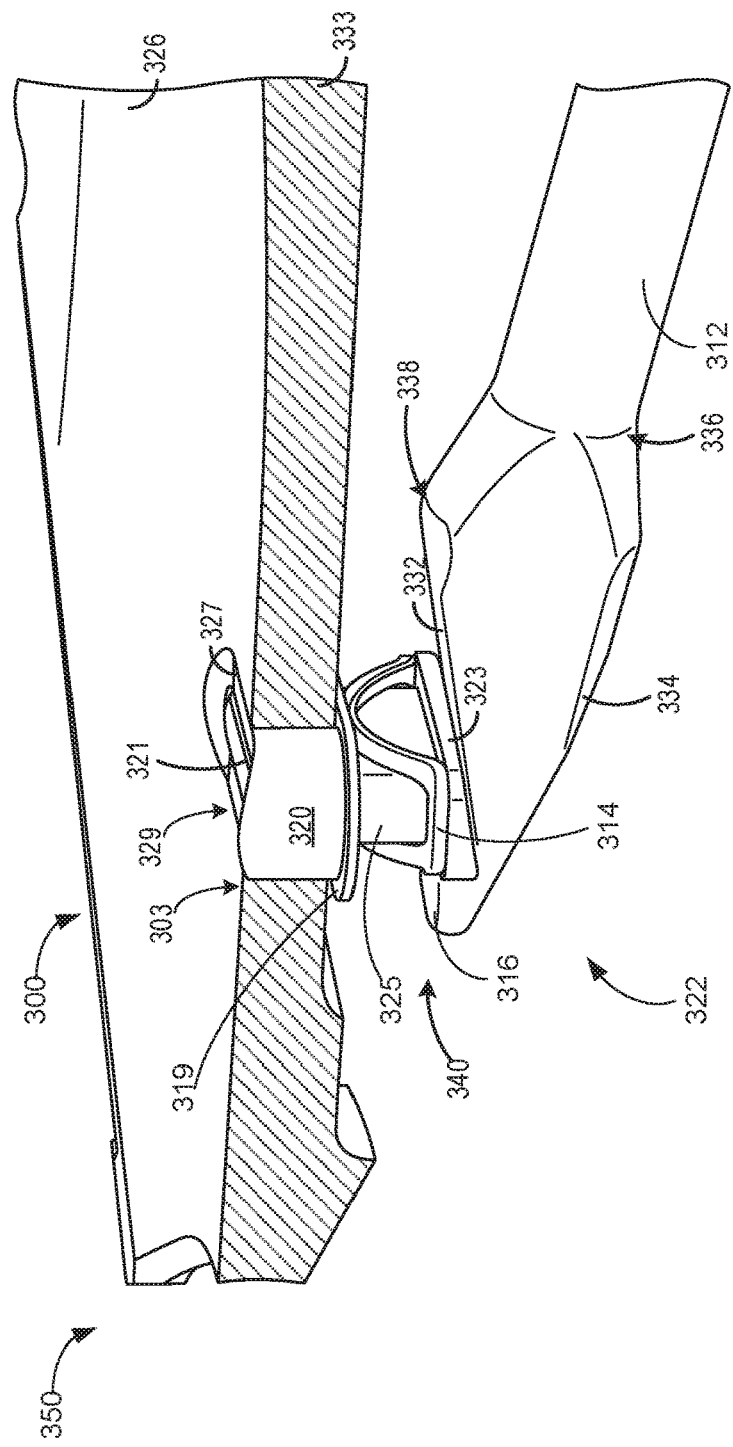
FIG. 4 illustrates a detailed depiction of the retracted tongue of FIG. 3A.
Figure 5:
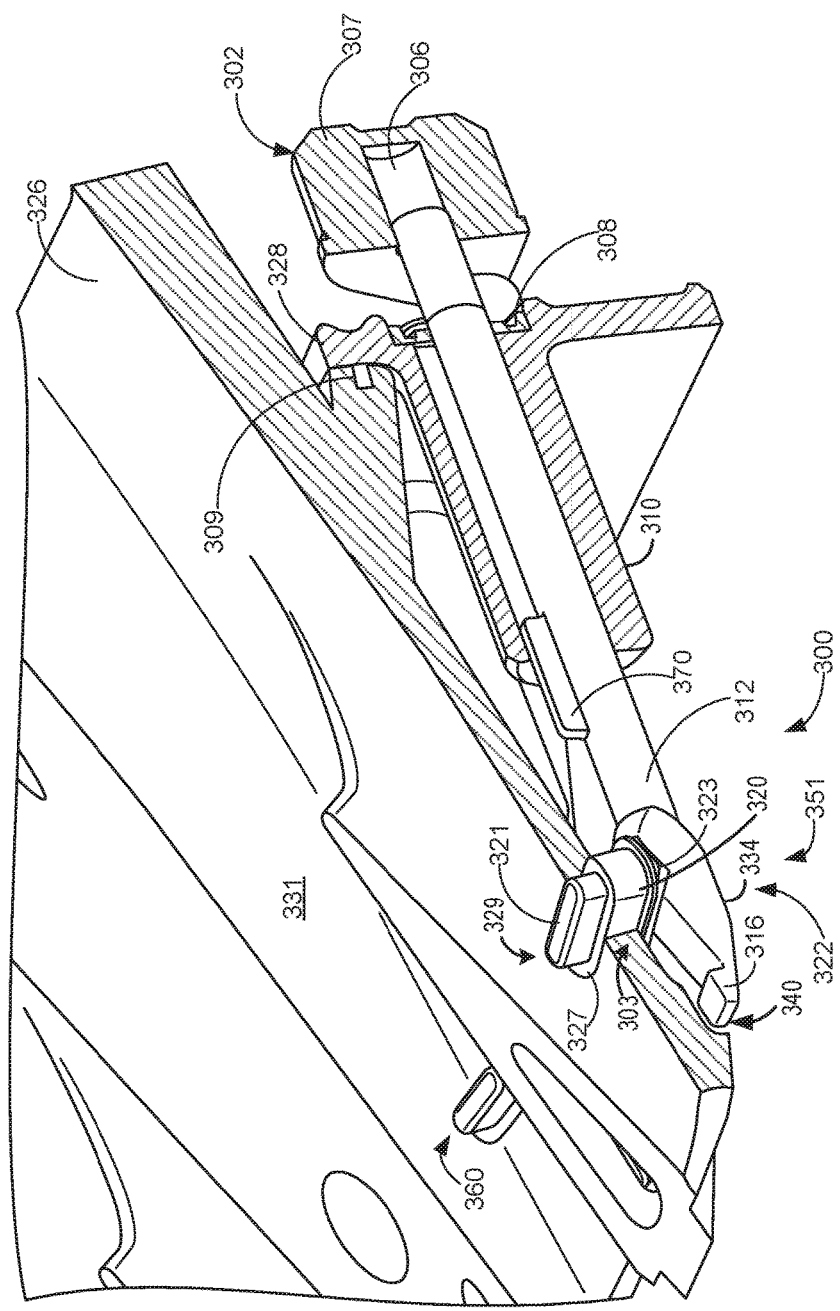
FIG. 5 depicts a detailed view of an extended tongue coupled to the actuator of FIG. 2.

FIG. 3A illustrates an intake runner 326 having a protrusion system 300. The protrusion system 300 may be one of the plurality of protrusion systems 204 associated with corresponding intake ports 212, illustrated in FIG. 2. FIG. 4 shows a magnified view of one region of the protrusion system 300 of FIG. 3A and FIG. 5 shows the protrusion system 300 in an extended position. FIGS. 3-5 will be described collectively.

Referring to FIG. 3A, the protrusion system 300 may be coupled to a bottom wall 333 of the intake runner 326. A second intake runner 331, adjacent to the intake runner 326, may be coupled to a second protrusion system 360, similar to the protrusion system 300. The intake runner 326 may be fluidically coupled to a corresponding intake port, for example, the intake port 212 of FIG. 2. The intake port and the coupled intake runner 326 may fluidically connect to a combustion chamber of a corresponding cylinder of the engine (for example, the combustion chamber 30 through the intake valve 52 illustrated in FIG. 1). In one example, the intake runner 326 and the second intake runner 331 may each fluidically connect to a corresponding intake port, and each intake port may connect to a different cylinder of the engine. In another example, the intake runner 326 and the second intake runner 331 may each connect to the same intake port, the intake port fluidically connecting to one cylinder of the engine. In one example, only one intake runner may have the protrusion system.

The protrusion system 300 is illustrated in a fully retracted position 301 in FIG. 3A. The protrusion system 300 is coupled to the bottom wall 333 of the intake runner 326, where the bottom wall 333 is right above a bulkhead 328, similar to the bulkhead 211 illustrated in FIG. 2. In one example, the protrusion system 300 may be same as the protrusion system 148 of FIG. 1.

A seal 309 may be present around an opening of the bulkhead 328, directly below the bottom wall 333 of the intake runner 326, a cross sectional view of which is illustrated in FIG. 3A. In one example, a coolant (for example, engine coolant) may be circulated along a tubular passage framed by the bulkhead 328, for example, to regulate a temperature of the protrusion system. The seal 309 in apposition with another mating surface inserted into the opening of the bulkhead 328 may prevent the coolant from leaking from the tubular passage.

The protrusion system 300 includes a cartridge 310 (same as the cartridge 214 inserted into the opening of the bulkhead 211 of FIG. 2). A cross section of the cartridge 310 inserted into the opening of the bulkhead 328 is illustrated in FIG. 3A. The opening of the bulkhead 328 may be vertically underneath the intake port associated with the intake runner 326, similar to the configuration of the cartridge 214 illustrated in FIG. 2. The cartridge 310 is configured such that the cartridge 310 corresponds with the dimensions of the opening of the bulkhead 328 and the cartridge 310 may be mated into the bulkhead 328. Upon inserting cartridge 310 into the bulkhead 328, an interior face of the cartridge 310 may be pressed against the seal 309. The cartridge 310 may be secured to the bulkhead 328 via bolts (similar to the bolts 216 in FIG. 2). The bolts may be first driven through corresponding holes on the cartridge 310 and then through corresponding holes on the bulkhead 328.

The protrusion system 300 includes a shaft 312 movably positioned along the cartridge 310. A shaft seal 308 may be present at around the shaft 312 at a region where the shaft inserts into the cartridge 310. At least a portion of the shaft 312 may be in face sharing contact with a complementary portion of the cartridge 310.

The shaft 312 may include an anti-rotation mechanism having a ridge 370 on the shaft 312 in face sharing contact with the cartridge 310, as illustrated in FIG. 3A. A vertical cross sectional view 381 of the shaft 312 with the ridge 370 inserted inside a groove 372 of the cartridge 310 (taken along line 380 of FIG. 3A) is illustrated in FIG. 3B. The ridge 370 may be in face sharing contact with the groove 372 along an inner surface of the cartridge 310. The ridge 370 may slide along the groove 372 as the shaft 312 is extended or retracted. At least a part of the ridge 370 may interface with the groove 372 of the cartridge 310, even when the shaft 312 is in a fully extended position, as illustrated in FIG. 5. By interfacing the groove of the cartridge 310, the ridge 370 may prevent rotation/spinning of the shaft 312 relative to the cartridge 310, maintaining the orientation of the protrusion system 300 relative to the opening 303 of the intake runner 326. In one example, more than one ridge may be present on the shaft 312 and may interface with one or more grooves on the cartridge 310 to prevent rotation of the shaft relative to the cartridge 310.

The shaft 312 includes a first end 302 and a second end 322, opposite the first end 302. The first end 302 of the shaft is configured to insert into and move along a corresponding stroke adjustment bore 306, the stroke adjustment bore 306 associated with an actuator 307. In one example, the actuator 307 may be an electric actuator. In other examples, the actuator may be a pneumatic, hydraulic, or other suitable actuator. The actuator 307 may project outside the cartridge 310, similar the plurality of actuators 206 projecting out of the cartridge 214 in FIG. 2

The second end 322 of the shaft 312 starting from a first region 336 may include a top surface 332 and a bottom surface 334, opposite the top surface 332, as illustrated in FIG. 3A and in a magnified view 350 of the second end 322 in FIG. 4. The top surface 332 and the bottom surface 334 starting from the first region 336 move away from each other, followed by a second region 338 from where the top surface 332 slopes downwards and meets the bottom surface 334 at a third region 340. In other examples, the spatial relationship between the slope of the top surface and the second surface may vary. At the second region 338, the top surface 332 may be located on a higher vertical plane than the third region 340 and the first region 336. The vertical displacement of the top surface between the second region 338 and the third region 340 may determine the slope of the top surface 332.

The top surface includes an embankment 316 at a junction of the top surface 332 and the bottom surface 334 at the third region 340. The embankment 316 may project away from the top surface 332 towards the intake runner 326.

The second end 322 of the shaft 312 includes a tongue 321 inside a seal body 320 coupled to a return spring 314. The seal body maintains separation between engine coolant and engine air charge. The tongue includes a base 323 and a vertical portion 325. The vertical portion 325 of the tongue at least partially inserts inside the seal body 320. The top surface 332 between the second region 338 and the embankment 316 may move relative to a bottom surface (not visible) of the tongue 321 and may remain in face sharing contact with at least a portion of the bottom surface of the tongue 321 during their relative motion. At least a portion of the base 323 of the tongue 321 may come in face sharing contact with the embankment 316, the embankment thus blocking further relative movement of the top surface and the tongue.

The seal body 320 may encircle at least a part of the vertical portion 325. The return spring 314 coupled to the seal body 320 may attach to the base 323 of the tongue. The seal body 320 may include a top surface 327 around a top opening 329 of the seal body 320, through which at least a part of the vertical portion 325 of the tongue may extend out. The top opening 329 of the seal body may correspond to the opening 303 in the bottom wall 333 of the intake runner 326. A lip 319 extending outwards from a base of the seal body 320 may be bonded to the bottom wall 333 of the intake runner 326, anchoring the seal body 320 to the bottom wall 333 defining the opening 303 of the intake runner 326. The vertical portion of the tongue may extend out of the opening 303 and into the intake runner 326.

While the protrusion system 300 is in a retracted position, the first end 302 of the shaft 312 may be positioned inside the stroke adjustment bore 306, as illustrated in FIG. 3A. In one example, the first end of the shaft may be positioned all the way into the stroke adjustment bore, occupying the bore completely. In other examples, the first end of the shaft may be positioned part of the way into the stroke adjustment bore. When the first end of the shaft is positioned to occupy the stroke adjustment bore, the tongue at the second end of the shaft may be in contact with the embankment 316, such that the tongue 321 along with the seal body coupled to the spring is along a lower vertical plane of the top surface. While in this position, the spring of the casing is not compressed, resulting in the tongue being inside the casing and not protruding through the top opening 329 of the casing. Thus, while in the retracted position, the tongue does not protrude out of the casing and hence does not project into the intake runner for generating air tumble, for example, during high engine load and speed.

FIG. 5 shows the protrusion system 300 in an extended position 351, wherein the first end 302 of the shaft 312 has been moved by the actuator 307 so that it is at least partially outside the stroke adjustment bore 306. The actuator may do so responsive to an engine load, air flow rate, and/or desired tumble, as will be discussed further with reference to FIGS. 6 and 7. As a result of the shaft 312 moving outward (towards the opening 303) along the stroke adjustment bore, the second end 322 of the shaft may move forward, such that embankment 316 of the top surface 332 moves away from the tongue base 323, while the slope of the top surface 332 at a higher plane moves under the tongue. The top surface 332 in contact with the tongue at the higher plane may compress the return spring 314 attached to the seal body 320. At least a portion of the tongue may protrude through the top opening 329 of the seal body 320 into the intake runner, generating tumble in the air flow.

The extent of the outward movement of the first end of the shaft along the stroke adjustment bore may determine a region of the slope of the top surface associated with the tongue, which in turn will determine the extent of compression of the spring and the resulting protrusion of the tongue from the opening of the seal body. Various engine operating conditions and corresponding positions of the tongue (determined by the positioning of the shaft by the actuator) will be discussed below with reference to FIGS. 6 and 7.

The methods and conditions for extending and retracting the tongue of the protrusion system are described in further detail below with reference to FIG. 6. A method for operating an embodiment of a protrusion system including a first tongue coupled to an intake port and a second tongue coupled to an intake manifold (similar to the protrusion system 148 and the second protrusion system 149 described above with reference to FIG. 1) is described below with reference to FIG. 7.

Figure 6:
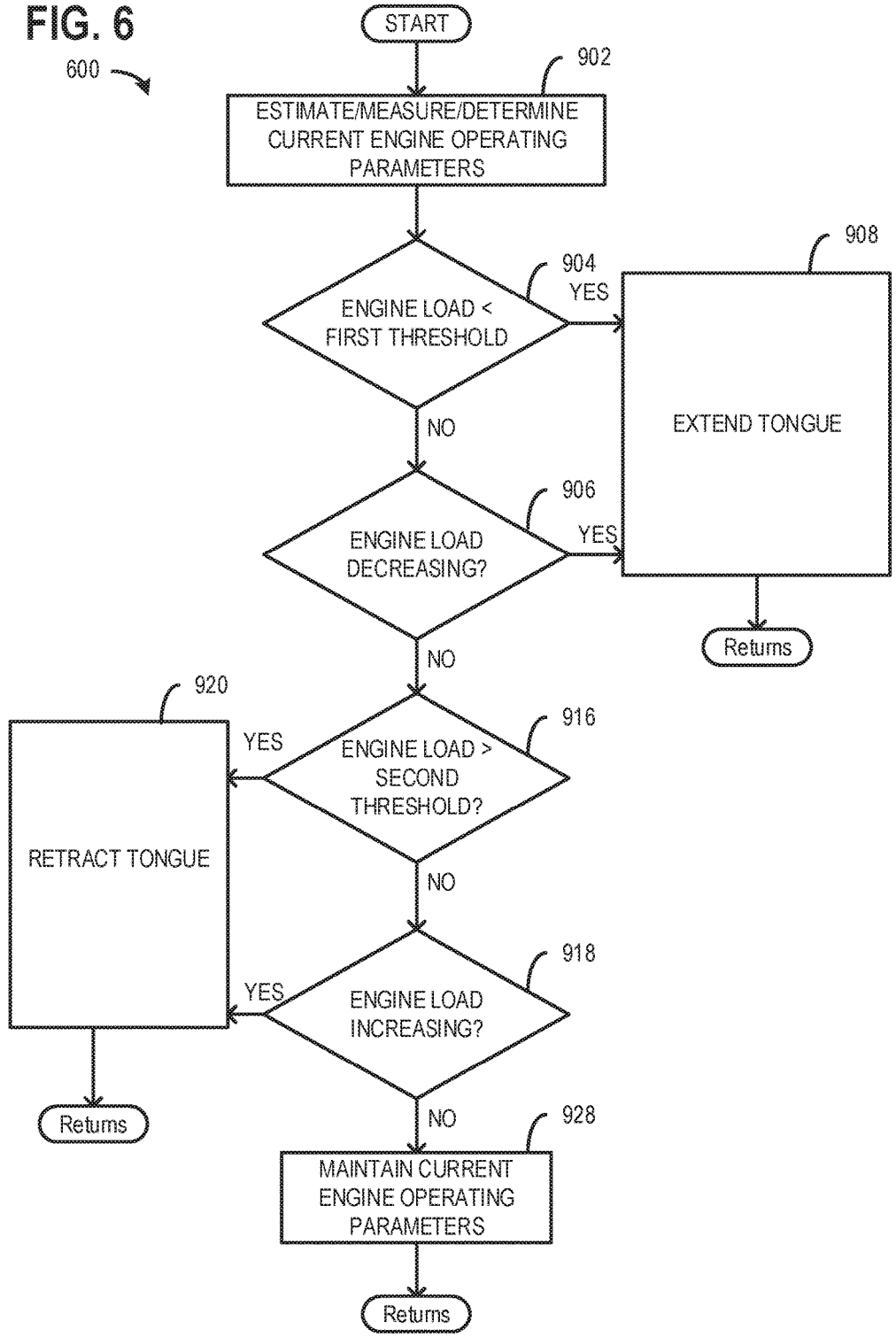
FIG. 6 demonstrates an exemplary method for adjusting extension and retraction of a tongue coupled to an actuation system along an intake runner.

FIG. 6 illustrates an exemplary method 600 for adjusting a position of a tongue in an intake runner of an engine cylinder head. The method may include conditions for at least partially extending the tongue due to a decreasing engine load to introduce/increase a tumble effect on the air/fuel mixture. In addition, the method may include conditions for at least partially retracting the tongue due to an increasing engine load to provide a tumble while allowing an increased rate of airflow.

Instructions for carrying out method 600 and the rest of the methods included herein may be executed by a controller, for example, the controller 12, based on instructions stored on a memory of the controller and in conjunction with signals received from sensors of the engine system, including NOx sensors, UEGO sensors, pressure sensors, etc., described above with reference to FIG. 1. The controller may employ engine actuators of the engine system to adjust engine operation, according to the methods described below. In one example, based on input from sensors, the controller 12 may employ actuators, such as the actuator 307 of the protrusion system 300 to regulate the extension and retraction of the tongue 321 into the corresponding intake runner 326, as illustrated in FIGS. 3A-5.

The method 600 may begin at 902 where the controller estimates, measures, and/or determines current engine operating parameters. The current engine operating parameters estimated may include, but are not limited to, manifold airflow rate, vehicle speed, throttle position, manifold vacuum, engine speed, boost level, compressor speed, and combustion air/fuel ratio. An engine load may be determined via one or more of the vehicle speed, throttle position, and manifold vacuum.

At 904, the method 600 includes determining if a current engine load is less than a first threshold. The first threshold may reflect a low engine load. In one example, the current engine load may be less than the first threshold when the engine is at idle and/or the throttle position is mostly closed (for example, the throttle is open 20%). As such, when the throttle is in the mostly closed position, less airflow is provided to the engine than when the throttle is fully open or mostly open (for example, the throttle is open 70%), reflecting that the current engine load is less than the first threshold.

If the engine load is not less than the first threshold, then the method proceeds to 906 to determine if the current engine load is decreasing. A decreasing engine load may be confirmed based on a throttle position decreasing at more than a threshold rate (e.g., being commanded towards a fully closed position), a decreasing vehicle speed, and/or an increasing manifold vacuum.

If the engine load is less than the first threshold (at 904) or the engine load is decreasing (at 906), the method 600 proceeds to 908 and extends the tongue of the protrusion system into the corresponding intake port. At 908, extending the tongue includes positioning (through the actuator) the shaft of the protrusion system such that the top surface of the second end of the shaft moves relative to the tongue. The tongue transitions from being in contact with a lower vertical plane to a higher vertical plane along the slope of top surface of the second end of the shaft, resulting in collapse of the spring associated with the seal body of the tongue. As mentioned above, a degree of extension of the tongue may be adjusted via adjusting the degree of movement of the shaft by the actuator (for example, the actuator may move the first end of the shaft part way out of the stroke adjustment bore, partially collapsing the spring along with partial extension of the tongue through the seal body into the intake port). A desired degree of tongue extension may first be determined based on the engine load, with the degree of extension increased as the engine load decreases (e.g., below the first threshold). In one example, when the engine load is less than the first threshold and the engine load begins to further decrease, the tongue may be maintained fully extended.

As an example, a vehicle may transition from a high load to a mid-load region. Responsive to the decreasing engine load, the controller may determine that the tongue is to be extended. However, based on the engine load being greater than the first threshold, the tongue may not be fully extended. If the engine load were to continue decreasing beyond the first threshold, the tongue may be fully extended. By maintaining the tongue less than fully extended at the mid-load region, a desired airflow rate may be provided at the mid-load condition.

It will be appreciated that when the engine load is higher than the first threshold, but lower than a second threshold (as elaborated below), the degree of extension may be similarly adjusted based on engine load. Specifically, when the engine load is between the first threshold and second threshold, the tongue may be partially extended, but not fully extended or fully retracted.

Returning to 906, if it is determined that the current engine load is not decreasing and the engine load is not less than the first threshold, then the method 600 proceeds to 916 to determine if the current engine load is greater than the second threshold. As mentioned above, the second threshold may be a higher engine load than the first threshold load, but may be less than a maximum rated engine load, for example. The engine load may be determined to be higher than the second threshold if a throttle position is more open than the throttle position at 904 (e.g., at wide open throttle), vehicle speed is high (e.g., greater than 40 mph), and/or a manifold vacuum is low.

If the current engine load is not greater than the second threshold then the method 600 proceeds to 918 to determine if the current engine load is increasing. The engine load may be determined to be increasing if a throttle opening is increasing at a threshold rate (e.g., towards wide open throttle), the vehicle speed is increasing, and/or the manifold vacuum is decreasing.

If the method 600 determines that the engine load is greater than the second threshold or that the engine load is increasing, then the method 600 may proceed to 920 and retract the tongue.

At 920, retracting the tongue includes positioning the shaft of the protrusion system through an actuator such that the top surface of the second end of the shaft moves relative to the tongue (the tongue transitions from being in contact with the higher vertical plane to the lower vertical plane of the slope of top surface), such that the return spring associated with the seal body is not compressed or only partially compressed, retracting the tongue fully or partially back into the seal body. It may be preferred to retract the tongue at increasing engine loads to increase air/fuel mixing at higher loads via an increased rate of airflow (and not obstruct airflow to the cylinder). Therefore, fuel efficiency may be increased by retracting the tongue to provide the increased rate of airflow while decreasing charge tumble. A degree of retraction may be determined based on the engine load. Specifically, the degree of retraction may be increased as the engine load increases (e.g., above the second threshold). The method 600 then returns.

In one example, when the engine load is between the first threshold and the second threshold, the tongue may be only partially retracted. However, if the engine load is equal to or greater than the second threshold, the tongue may be fully retracted. This may be due to a demand for increased airflow at the higher load. The fully retracted tongue may not obstruct an intake runner (e.g., cylinder port) and not manipulate an airflow charge motion tumble. Retracting the tongue at higher engine loads may allow the desired air demand to be met.

Returning to 918, if it is determined that the engine load is not increasing, then the method may proceed to 928 and maintain current engine operating parameters which includes not adjusting the tongue. For example, an existing extension/retraction state of the tongue may be maintained. The method 600 then returns.

Method 600 thus represents an exemplary method for adjusting operation of a tongue of a single protrusion system located in an intake runner of a cylinder head. The tongue may be extended upon determining an engine load is decreasing and retracted upon determining an engine load is increasing. In this way, combustion may be optimized by extending the tongue to provide a tumble to increase air/fuel mixing at lower engine loads and by retracting the tongue to provide an increased airflow at higher engine loads.

Figure 7:
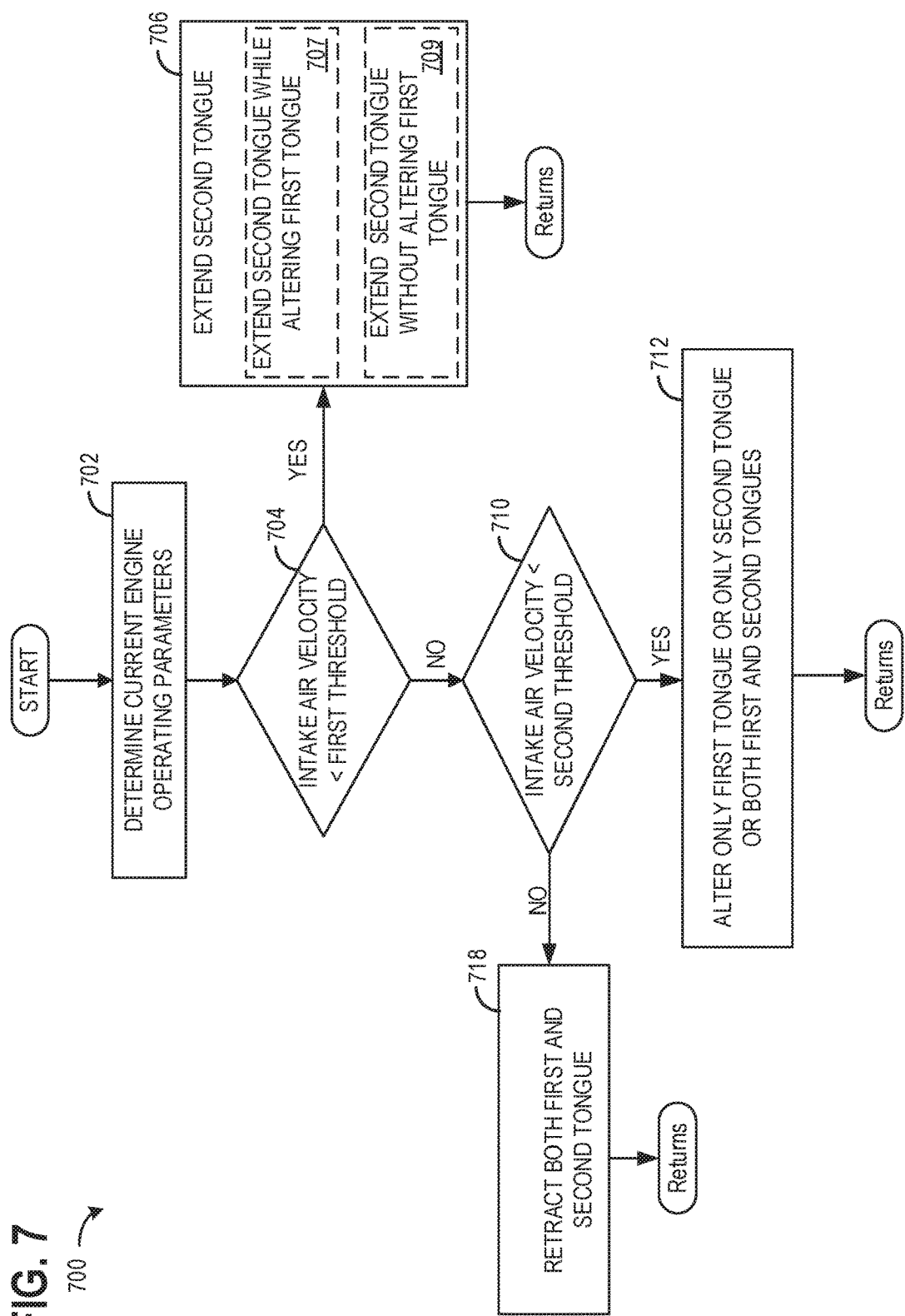
FIG. 7 demonstrates an exemplary method for adjusting two, distinctly positioned tongues within an intake system of the engine.

FIG. 7 demonstrates method 700, which may be used for adjusting each of a first tongue of a first protrusion system in an intake runner of an intake port (e.g., cylinder port) and a second tongue of a second protrusion system in an intake manifold upstream of the intake port, similar to the protrusion system 148 and the second protrusion system 149 respectively, described above with reference to FIG. 1. Herein, the first tongue may allow for individual airflow adjustments to the cylinder while the second tongue allows for global (common) airflow adjustments to all engine cylinders. However, in alternate embodiments, at least one tongue may be present for each engine cylinder in the corresponding intake ports, allowing flow to each cylinder to be adjusted independently and individually.

The method 700 may be implemented independently of method 600. Instructions for carrying out method 700 and the rest of the methods included herein may be executed by a controller, for example, the controller 12, based on instructions stored on a memory of the controller and in conjunction with signals received from sensors of the engine system, including NOx sensors, UEGO sensors, pressure sensors, etc., described above with reference to FIG. 1. The controller may employ engine actuators of the engine system to adjust engine operation, according to the methods described below. In one example, based on input from sensors, the controller 12 may employ actuators, such as the actuator 307 of the protrusion system 300 to regulate the extension and retraction of the tongue 321 into the corresponding intake runner 326, as illustrated in FIGS. 3A-5.

The method 700 may begin at 702, which includes estimating, measuring, and/or determining engine operating parameters. The engine operating parameters assessed may include, but are not limited to, measuring an airflow rate, a vehicle speed, a throttle position, a manifold vacuum, an engine speed, boost level, and an air/fuel ratio. An engine load may be determined via one or more of the vehicle speed, throttle position, and manifold vacuum.

At 704, the method 700 determines if an intake air velocity is less than a first threshold velocity. In one example, the intake air velocity may be determined based on input from a mass airflow sensor (for example, the MAF sensor 120 of FIG. 1 providing MAF signal to the controller 12). One example when the intake air velocity may be less than the first threshold velocity may include the engine being at idle and/or the engine load being low, where the throttle position is mostly closed (for example, 80% closed). If the intake air velocity is less than the first threshold at 704, the method 700 proceeds to 706, where the second tongue coupled to the intake manifold may be partially to fully extended to decrease the cross sectional area of the intake manifold, thereby increasing the velocity of the intake air flowing through the intake manifold towards all of the cylinders of the engine.

Because the second tongue is located farther from the cylinders, additional manipulation of the air flow may be desired as the air flow approaches the cylinder, for example, by regulating the position of the first tongue along the intake runner which is located closer to the cylinder. In an example at 707, in addition to extending the second tongue, the first tongue coupled to the intake runner of a specific cylinder may be altered to generate the desired charge motion in the airflow to the specific cylinder. The desired charge motion rate may be based on one or more of the throttle position, engine load, airflow rate, and air/fuel mixing. In one example, the first tongue may be at least partially extended from a retracted position to increase charge motion, while in another example, the first tongue may be at least partially retracted from an extended position to decrease charge motion. In an example at 709, the airflow entering the specific cylinder may have the desired charge motion rate. Hence, only the second tongue may be selectively altered while the first tongue may remain unaltered. The method 700 then returns.

If the intake air velocity at 704 is not less than the first threshold velocity, the method 700 proceeds to 710 to determine if the intake air velocity is less than a second threshold velocity, where the second threshold velocity is higher than the first threshold velocity. If the intake air velocity is not less than the second threshold velocity, the method 700 proceeds to 718, where both the first tongue and the second tongue may be retracted. In one example, both the tongues may be completely retracted, enabling the intake air with velocity more than the second threshold to be directed to the engine cylinder. One example when the intake air velocity may be higher than the second threshold may include the engine load being high, where the throttle position is mostly open (for example, 80% open). The method 700 then returns.

If the intake air velocity is less than the second threshold velocity, the method 700 proceeds to 712. When the intake air velocity is more than the first threshold velocity and less than the second threshold velocity, either the first tongue or the second tongue may be altered selectively. In another example, both of the first tongue and the second tongue may be altered. Altering may be based on one or more of the throttle position, engine load, airflow rate, and air/fuel mixing. Altering may include partially to fully extending, or partially to fully retracting either the first tongue or the second tongue or each of the first tongue and the second tongue.

The altering of both the first tongue and second tongue may be performed at the same rate or at different rates. For example, the first tongue may be extended at a higher or lower rate and/or to a higher or lower degree of extension than the extension of the second tongue. Likewise, the first tongue may be extended at a higher or lower rate and/or to a higher or lower degree of extension than the retraction of the second tongue. In still other examples, the extension/retraction of the first tongue may be based on the extension/retraction of the second tongue. For example, as the extension of the first tongue is increased, the extension of the second tongue may also be increased. In another example, as the extension of the first tongue is increased, the extension of the second tongue may be decreased. In alternate examples, the altering of the first and second tongue may be at rates that are independent of each other. The method 700 then returns.

In this way, a first tongue may be extended to generate intake airflow tumble and a second tongue may be extended to increase an airflow rate. The second tongue may be operated in coordination with the first tongue to provide synergistic benefits to air-fuel mixing. Further, the first tongue and the second tongue may be adjusted to be at different degrees of extension (e.g., the first tongue is 50% extended while the second tongue is 25% extended).

The technical effect of extending or retracting the tongue of the protrusion system is an increase in air/fuel mixing and thereby, an increase in fuel economy. Further, the protrusion system may be used to maintain or alter an airflow rate to a desired airflow rate. By using an actuator based efficient and compact protrusion system for extending the tongue of the protrusion system through an opening at the bottom wall of the intake runner nearest the cylinder, the desired tumble may be generated in the intake air. Additionally, the tongue may be adjusted based on sensed engine operations to optimize fuel efficiency of each individual engine cylinder.

An example system, including a cylinder with an intake runner, a protrusion system positioned in an opening on a bottom wall of the intake runner nearest the cylinder, the protrusion system including a tongue movably positioned inside a spring-loaded seal body, the spring-loaded seal body anchored to a region of the bottom wall defining the opening. A first example of the system includes, a controller storing non-transitory instructions in memory that when executed cause the controller to activate an actuator for positioning the tongue of the protrusion system outward from the spring-loaded seal body through the opening on the bottom wall of the intake runner, responsive to an operating condition. A second example of the system optionally includes the first example and further includes, wherein the operating condition includes an intake throttle being moved from a first position to a second position, the throttle in the second position more closed than the throttle in the first position. A third example of the system optionally includes one or more of the first and second examples, and further includes wherein the protrusion system includes a shaft having a first end coupled to the actuator and a second end, opposite the first end, the second end including a sloped top surface in face sharing contact with a bottom surface of the tongue. A fourth example of the system optionally includes one or more of the first through the third examples, and further includes wherein the first end of the shaft is configured to be positioned inside a stroke adjustment bore associated with the actuator when the tongue is in a fully retracted position, and the first end of the shaft is configured to be positioned at least partially outside the stroke adjustment bore when the tongue is in an at least partially extended position. A fifth example of the system optionally includes one or more of the first through the fourth examples, and further includes wherein an embankment in the second end of the shaft is at least partially in face sharing contact with a base of the tongue when the tongue is in the fully retracted position. A sixth example of the system optionally includes one or more of the first through the fifth examples, and further includes wherein the embankment is coupled to a lowest vertical plane of the second end of the shaft. A seventh example of the system optionally includes one or more of the first through the sixth examples, and further includes wherein a spring of the spring-loaded seal body is not compressed when the tongue is in the fully retracted position and the spring is at least partially compressed when the tongue is in the at least partially extended position. An eighth example of the system optionally includes one or more of the first through the seventh examples, and further includes wherein the sloped top surface is configured to be slideably movable relative to the bottom surface of the tongue when the first end of the shaft moves relative to the stroke adjustment bore. A ninth example of the system optionally includes one or more of the first through the eighth examples, and further includes wherein the spring-loaded seal body includes a lip, the lip anchoring the spring-loaded seal body to the region of the bottom wall defining the opening of the intake runner. A tenth example of the system optionally includes one or more of the first through the ninth examples, and further includes a second protrusion system, including a second tongue larger than the first tongue, the second tongue movably positioned inside a second spring-loaded seal body, the second spring-loaded seal body anchored to an upper wall of an intake manifold, the intake manifold fluidically connecting to the intake runner.

An example cylinder head system, including a cylinder head including an intake port above a bulkhead, and a cartridge of a protrusion system inserted into the bulkhead, the protrusion system having a first actuator configured to extend and retract a tongue from a spring-loaded seal body into a runner coupled to the intake port. A first example of the system further comprising a second cartridge of a second protrusion system inserted into the bulkhead, the second protrusion system having a second actuator configured to extend and retract a second tongue from a second spring-loaded seal body into a second runner. A second example of the system optionally includes the first example and further includes, wherein the runner fluidically connects to a first cylinder and the second runner fluidically connects to a second cylinder of an engine. A third example of the system optionally includes one or more of the first and second examples, and further includes wherein each of the runner and the second runner fluidically connect to a first cylinder of an engine.

An example method, comprising adjusting a protrusion system in an intake runner of a cylinder intake port in response to a sensed vehicle operating parameter, the protrusion system including a tongue inside a spring-loaded seal body anchored to a bottom wall defining an opening into the intake runner. A first example of the method wherein adjusting the protrusion system comprises, responsive to an engine load less than a first threshold, actuating an actuator to move a shaft at least partly out of a stroke adjustment bore of the protrusion system to fully extend the tongue from the spring-loaded seal body through the bottom wall into the intake runner. A second example of the method optionally includes the first example and further includes wherein adjusting the protrusion system comprises, responsive to the engine load more than a second threshold, the second threshold greater than the first threshold, actuating the actuator to move the shaft at least partially back inside the stroke adjustment bore to fully retract the tongue into the spring-loaded seal body. A third example of the method optionally includes the first through the second examples, and further includes wherein adjusting the protrusion system comprises, responsive to the engine load between the first threshold and the second threshold, actuating the actuator to move the shaft to partially extend the tongue from the spring-loaded seal body through the bottom wall into the intake runner. A fourth example of the method optionally includes the first through the third examples, and further includes adjusting a second protrusion system responsive to an intake air velocity, the second protrusion system including a second tongue inside a second spring-loaded seal body anchored to a top wall of an intake manifold fluidically connected to the intake runner.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake system, comprising:
a cylinder with an intake runner;
a protrusion system positioned in an opening on a bottom wall of the intake runner nearest the cylinder, the protrusion system including a tongue movably positioned inside a spring-loaded seal body, the spring-loaded seal body anchored to a region of the bottom wall defining the opening; and
a controller storing non-transitory instructions in memory that, when executed, cause the controller to activate an actuator for positioning the tongue of the protrusion system outward from the spring-loaded seal body through the opening on the bottom wall of the intake runner, responsive to an operating condition.

2. The system of claim 1, wherein the operating condition includes an intake throttle being moved from a first position to a second position, the intake throttle in the second position more closed than the intake throttle in the first position.

3. The system of claim 1, wherein the protrusion system includes a shaft having a first end coupled to the actuator and a second end, opposite the first end, the second end including a sloped top surface in face sharing contact with a bottom surface of the tongue.

4. The system of claim 3, wherein the first end of the shaft is configured to be positioned inside a stroke adjustment bore associated with the actuator when the tongue is in a fully retracted position, and the first end of the shaft is configured to be positioned at least partially outside the stroke adjustment bore when the tongue is in an at least partially extended position.

5. The system of claim 4, wherein an embankment in the second end of the shaft is at least partially in face sharing contact with a base of the tongue when the tongue is in the fully retracted position.

6. The system of claim 5, wherein the embankment is coupled to a lowest vertical plane of the second end of the shaft.

7. The system of claim 4, wherein a spring of the spring-loaded seal body is not compressed when the tongue is in the fully retracted position and the spring is at least partially compressed when the tongue is in the at least partially extended position.

8. The system of claim 4, wherein the sloped top surface is configured to be slideably movable relative to the bottom surface of the tongue when the first end of the shaft moves relative to a fitting groove.

9. The system of claim 1, wherein the spring-loaded seal body includes a lip, the lip anchoring the spring-loaded seal body to the region of the bottom wall defining the opening of the intake runner.

10. An intake system, comprising:
a cylinder with an intake runner;
a protrusion system positioned in an opening on a bottom wall of the intake runner nearest the cylinder, the protrusion system including a tongue movably positioned inside a spring-loaded seal body, the spring-loaded seal body anchored to a region of the bottom wall defining the opening; and
a second protrusion system, including a second tongue larger than the first tongue, the second tongue movably positioned inside a second spring-loaded seal body, the second spring-loaded seal body anchored to an upper wall of an intake manifold, the intake manifold fluidically connecting to the intake runner.

11. A cylinder head system, comprising:
a cylinder head including an intake port above a bulkhead;
a cartridge of a protrusion system inserted into the bulkhead, the protrusion system having a first actuator configured to extend and retract a tongue from a spring-loaded seal body into a runner coupled to the intake port; and
a controller storing non-transitory instructions in memory that, when executed, cause the controller to activate an actuator for positioning the tongue of the protrusion system outward from the spring-loaded seal body through an opening in a wall of the intake port, responsive to an operating condition.

12. The system of claim 11, further comprising a second cartridge of a second protrusion system inserted into the bulkhead, the second protrusion system having a second actuator configured to extend and retract a second tongue from a second spring-loaded seal body into a second runner.

13. The system of claim 12, wherein the runner fluidically connects to a first cylinder of an engine and the second runner fluidically connects to a second cylinder of the engine.

14. The system of claim 12, wherein each of the runner and the second runner fluidically connects to a first cylinder of an engine.

* * * * *